United States Patent [19]

Juman

[11] Patent Number: 5,319,557
[45] Date of Patent: Jun. 7, 1994

[54] CONSTANT OPERATING SPEED HOLDING SYSTEM FOR A MOTORCYCLE

[75] Inventor: Shinji Juman, Saitama, Japan

[73] Assignee: Honda Giken Kogyo Kabushiki Kaisha, Tokyo, Japan

[21] Appl. No.: 862,360

[22] Filed: Apr. 2, 1992

[30] Foreign Application Priority Data

Apr. 2, 1991 [JP] Japan .................................. 3-094985

[51] Int. Cl.$^5$ .............................................. B60K 31/04
[52] U.S. Cl. ........................... 364/426.04; 364/431.07; 180/179
[58] Field of Search ....................... 364/426.04, 426.02, 364/431.07; 180/170-179, 197; 303/92

[56] References Cited

U.S. PATENT DOCUMENTS

| 4,580,537 | 4/1986 | Uchiyama | 180/170 |
| 4,611,561 | 9/1986 | Suyama | 180/175 |
| 4,706,195 | 11/1987 | Yoshino et al. | 364/426 |
| 4,838,780 | 6/1989 | Yamagata et al. | 180/178 |
| 4,966,247 | 10/1990 | Masuda | 180/171 |
| 4,969,531 | 11/1990 | Hirakata et al. | 364/426.04 |

FOREIGN PATENT DOCUMENTS 49-44830 11/1974 Japan .

*Primary Examiner*—Thomas G. Black
*Assistant Examiner*—Tan Q. Nguyen

[57] ABSTRACT

The present invention provides a constant operating speed holding system for a motorcycle, capable of inhibiting constant operating speed holding operation while the motorcycle is not moving. A constant operating speed hold inhibiting device inhibits the constant operating speed holding operation of a constant operating speed holding mechanism regardless of the operating speed V calculated by an operating speed calculating device when the rotating speed Nf of the free wheel of the motorcycle detected by a wheel speed detecting mechanism is very small.

9 Claims, 3 Drawing Sheets

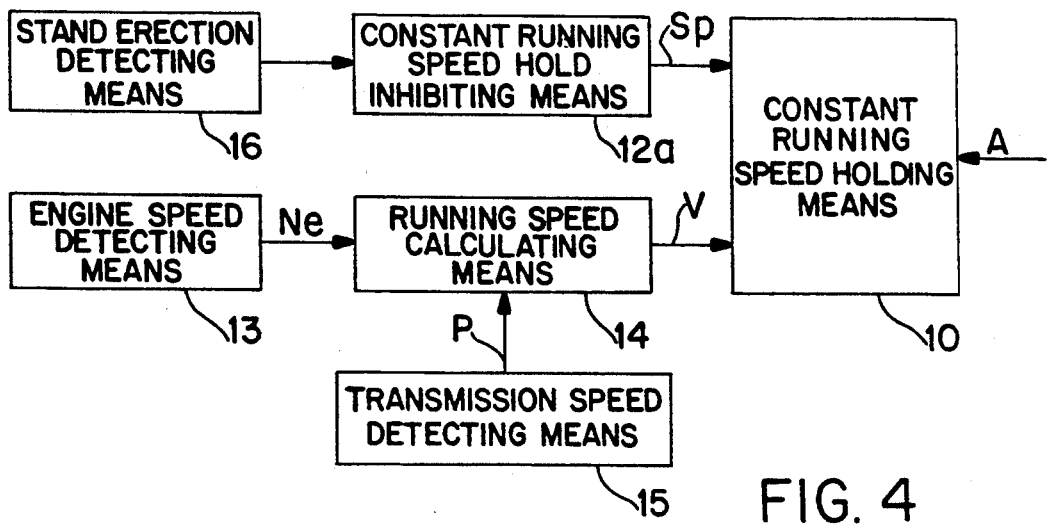
FIG. 4
FIG. 5
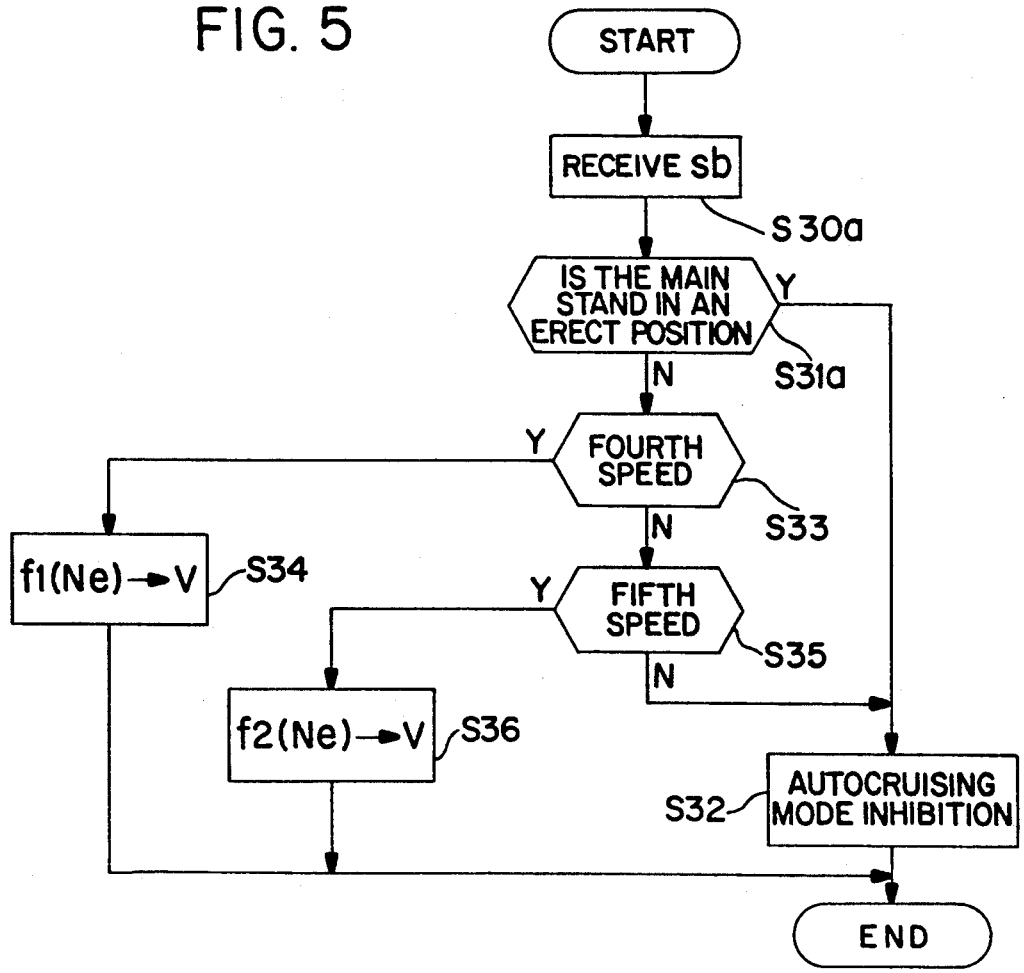

CONSTANT OPERATING SPEED HOLDING SYSTEM FOR A MOTORCYCLE

BACKGROUND OF THE INVENTION

1. Field of the Invention

The present invention relates to a constant operating speed holding system for a motorcycle and, more particularly, to a constant operating speed holding system for a motorcycle, capable of inhibiting constant operating speed holding operation while the motorcycle is not moving.

2. Description of Background Art

A constant operating speed holding system capable of holding the operating speed constant in response to a constant operating speed hold command. This system is sometimes referred to as an autocruising system which has been developed to mitigate the fatigue of a rider driving a motorcycle and to reduce fuel consumption by suppressing variations in the operating speed.

Accurate detection of the operating speed is essential to stabilize the operating speed at a set operating speed. An operating speed calculating method disclosed in Japanese Patent Publication (Kokoku) No. Sho 49-44830 detects the rotating speed of a magnet rotor attached to one end of the speedometer cable by a magnetic detecting device, such as a reed switch or a Hall device, and calculates the operating speed on the basis of a pulse signal provided by the magnetic detecting device.

In determining the operating speed of the motorcycle on the basis of the rotating speed of the wheel of the motorcycle detected by measuring the revolving speed of the speedometer cable, a detected operating speed in some cases includes an error due to the vibration of the speedometer cable when the motorcycle is caused to vibrate by irregularities in the road surface. Therefore, a constant operating speed holding system employing this known operating speed calculating method repeats, although at rare intervals, useless acceleration and deceleration.

A recently proposed operating speed detecting method developed to detect the operating speed without employing the speedometer cable detects the engine speed and the speed of the transmission, i.e., transmission gear ratio, and calculates the operating speed on the basis of the engine speed and the speed of the transmission.

OBJECTS AND SUMMARY OF THE INVENTION

The operating speed detecting method that calculates the operating speed on the basis of the engine speed and the speed of the transmission has a disadvantage that false speed information is given to the constant operating speed holding system if a constant operating speed hold command is given while the main stand is erected and the driving wheel is racing on the main stand and, consequently, the driving wheel continues racing at the rotating speed.

Accordingly, it is an object of the present invention to solve the foregoing problem in the prior art constant operating speed holding system and to provide a constant operating speed holding system for a motorcycle, capable of inhibiting the operating speed control operation of its constant operating speed holding unit when the motorcycle is not moving.

The present invention provides, to achieve the object, a constant operating speed holding system for a motorcycle, capable of holding the operating speed of the motorcycle constant in response to a constant running speed hold command and characterized by the following means.

(1) A wheel speed detecting means for detecting the rotating speed of the free wheel, and a constant running speed hold inhibiting means for inhibiting the constant running speed holding operation when the rotating speed of the free wheel is not higher than a predetermined value.

(2) A stand erection detecting means for detecting the main stand in an erect position, and a constant operating speed hold inhibiting means for inhibiting the constant running speed holding operation when the main stand is in an erect position.

When the motorcycle is virtually stopped with the free wheel rotating at a very low rotating speed or with the main stand in an erect position, the constant running speed holding operation is inhibited, so that the accidental operation of the constant running speed holding means in a state other than a running state can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a block diagram of a constant running speed holding system in another embodiment according to the present invention; and FIG. 5 is a flow chart of assistance in explaining the operation of the constant running speed holding system of FIG. 4.

DETAILED DESCRIPTION OF THE PREFERRED EMBODIMENT

Figure 1:
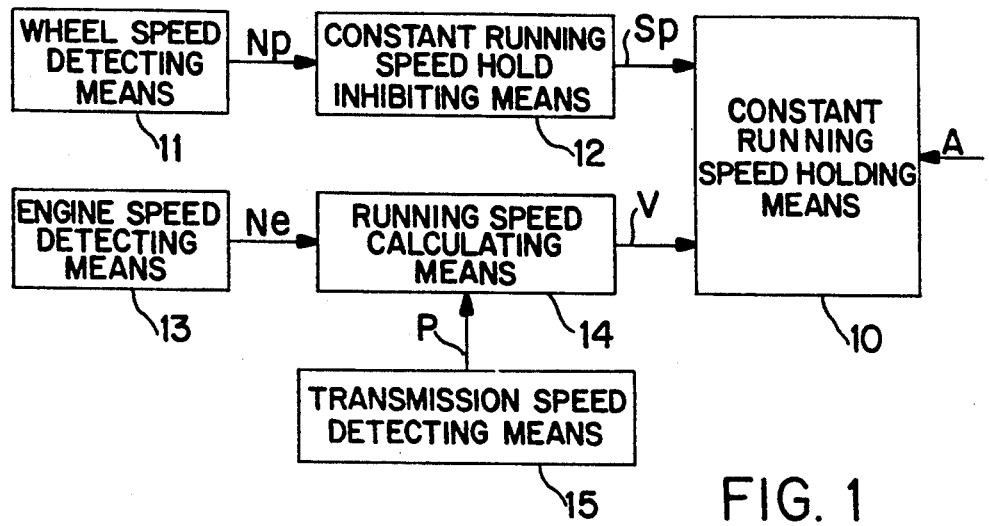
FIG. 1 is a block diagram showing the function of the present invention.

FIG. 1 is a block diagram of a constant running speed holding system for a motorcycle, in a preferred embodiment according to the present invention.

Referring to FIG. 1, a wheel speed detecting means 11 detects the rotating speed Nf of the free wheel, i.e., the front wheel, of the motorcycle and gives a detection signal representing the rotating speed Nf to a constant running speed hold inhibiting means 12. If the rotating speed Nf is not higher than a predetermined lower limit, the constant running speed hold inhibiting means 12 gives a constant running speed hold inhibit signal Sp to a constant running speed holding means 10.

An engine speed detecting means 13 detects the engine speed Ne and generates an engine speed signal representing the engine speed Ne to a running speed calculating means 14. A transmission speed detecting means 15 detects the speed P of the transmission and generates a transmission speed signal representing the speed P to the running speed calculating means 14. Then, the running speed calculating means 14 calculates the current running speed V on the basis of the engine speed Ne and the speed P of the transmission.

In response to a constant running speed hold command A, the constant running speed holding means 10 controls a fuel feed system, not shown, with reference to the running speed V calculated by the running speed calculating means 14 so that a desired running speed is maintained.

If the rotating speed Nf detected by the wheel speed detecting means 11 is lower than the lower limit, the constant running speed hold inhibiting means 12 provides the constant running speed hold inhibit signal Sp to inhibit constant running speed holding operation of the constant running speed holding means 10 regardless of the running speed V calculated by the running speed calculating means 14.

Figure 2:
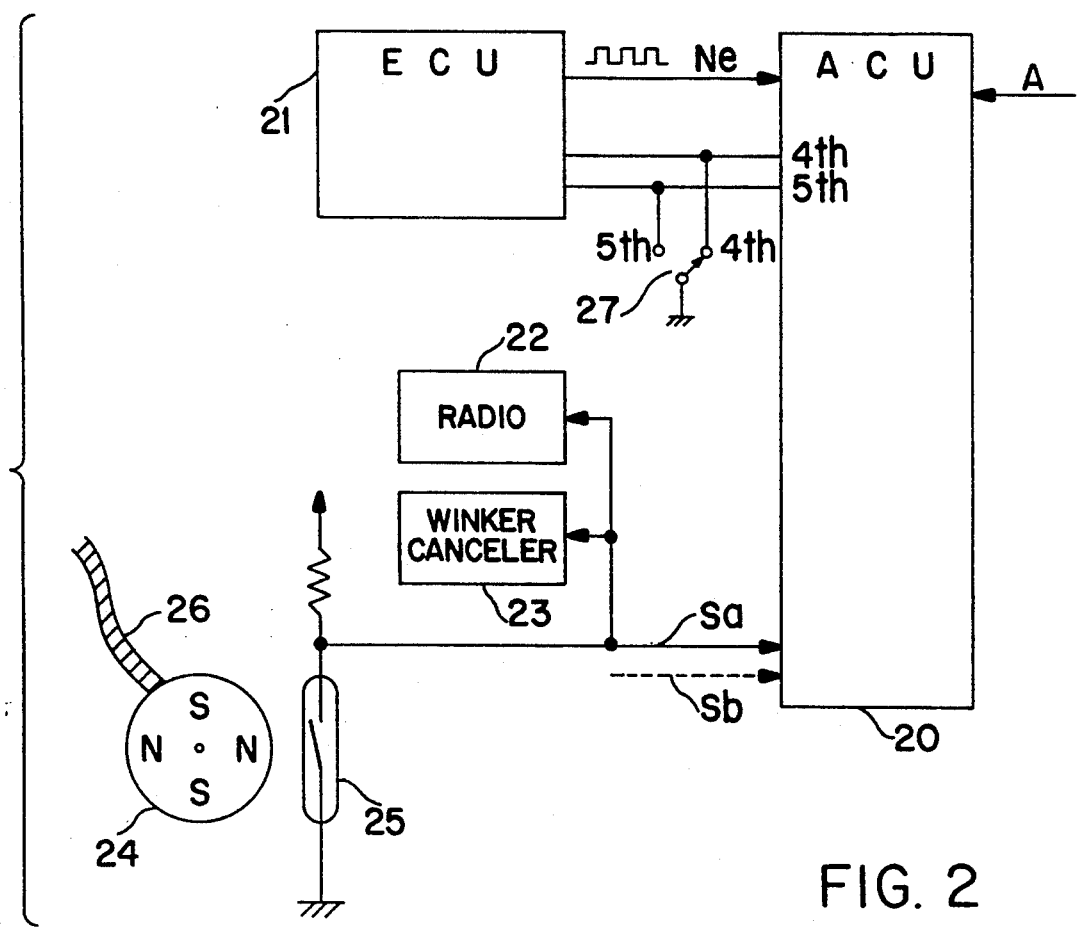
FIG. 2 is a block diagram of an essential portion of a constant running speed holding system in a preferred embodiment according to the present invention incorporated into a motorcycle.
Figure 3:
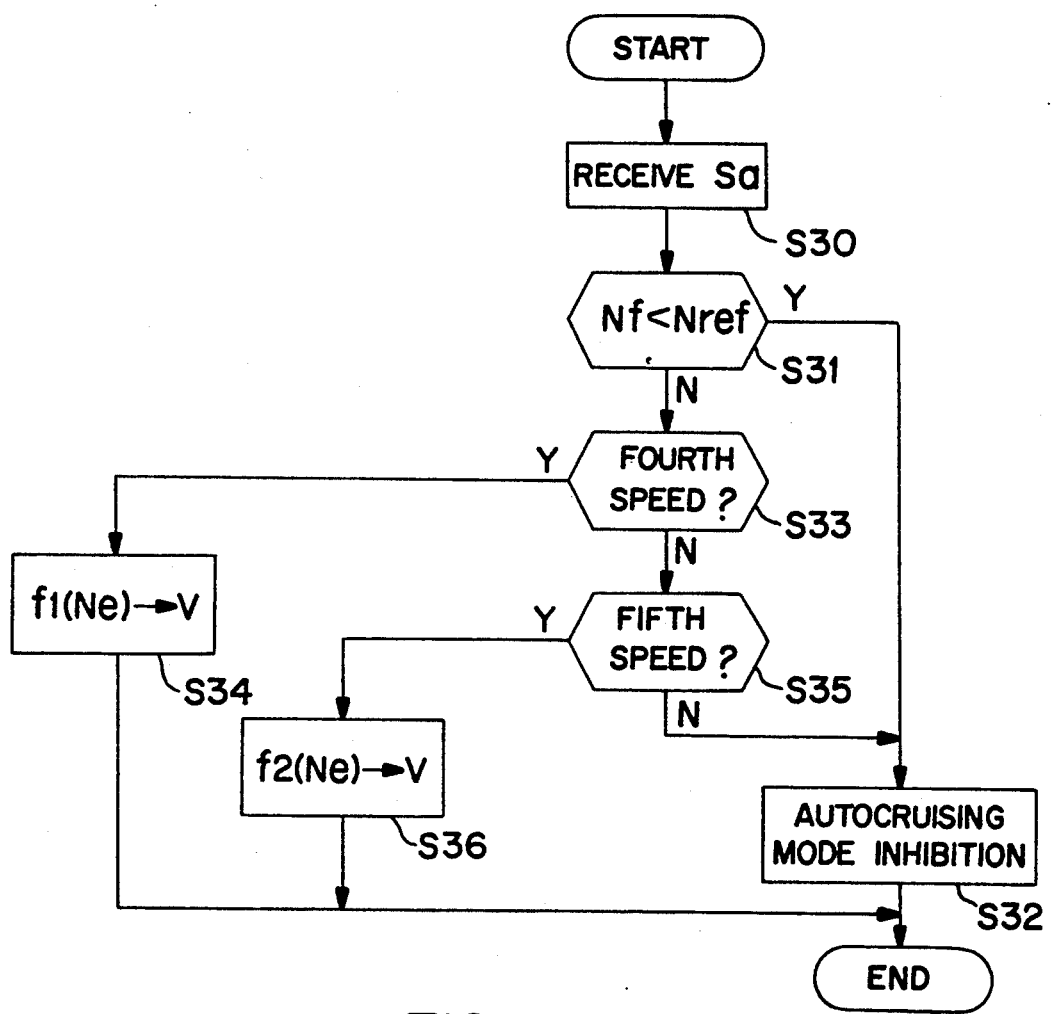
FIG. 3 is a flow chart of assistance in explaining the operation of the constant running speed holding system of FIG. 2.

FIG. 2 is a block diagram of an essential portion of a motorcycle incorporating a preferred embodiment of the present invention, and FIG. 3 is a flow chart of assistance in explaining the operation of the essential portion. A method of detecting the running speed to be carried out when an autocruising mode is selected will be described hereinafter.

Referring to FIG. 2, a magnet rotor 24 is attached to one end of a speedometer cable. A reed switch 25 detects the magnetic poles of the magnet rotor 24 and generates a pulse signal Sa to an autocruising unit (hereinafter abbreviated to "ACU") 20, a radio 22 and a winker canceler 23.

An engine control unit (hereinafter abbreviated to "ECU") 21 detects the engine speed Ne and gives an engine speed signal representing the engine speed Ne to the ACU 20. A switching unit 27 selects a contact corresponding to the speed of the transmission to give a transmission speed signal representing the speed of the transmission to the ACU 20 and the ECU 21.

When a constant operating speed hold command A is given to the ACU 20, the pulse signal Sa provided by the reed switch 25 detecting the magnetic poles of the magnet rotor 24 is received by the ACU 20 in step S30.

In step S31, the rotating speed Nf calculated on the basis of the pulse signal Sa is compared with a lower limit rotating speed Nref for permitting autocruising. If the rotating speed Nf is lower than the lower limit rotating speed Nref, the autocruising mode is inhibited in step S32.

If the rotating speed Nf is higher than the lower limit rotating speed Nref, a query is made in step S33 to see if the transmission is set forth for the fourth speed. If the response in step S33 is affirmative, the operating speed V is calculated on the basis of the engine speed Ne by using an expression (1).

$$f1(Ne) = 65 \times Ne/3620 \quad (1)$$

If the response in step S33 is negative, a query is made in step S35 to see if the transmission is set for the fifth speed. If the response in step S35 is affirmative, the operating speed V is calculated by using an expression (2).

$$f2(Ne) = 65 \times Ne/2840 \quad (2)$$

If the response in step S35 is negative, step S32 is executed to inhibit the autocruising mode.

In this embodiment, the autocruising operation is inhibited regardless of the operating speed calculated on the basis of the engine speed Ne if the rotating speed Nf of the free wheel is lower than the lower limit rotating speed Nref and it is decided that the motorcycle is virtually stopped. Therefore, the accidental operation of the autocruising function is prevented, for example, when the main stand is in an erect position.

A constant operating speed holding system in a second embodiment according to the present invention is shown in FIG. 4, in which parts like or corresponding to those shown in FIG. 1 are denoted by the same reference characters.

Referring to FIG. 4, a stand erection detecting means 16 detects the position of the main stand. Upon the detection of the main stand in an erect position, the stand erection detecting means 16 gives a stand erection signal to a constant operating speed hold inhibiting means 12a. Upon the reception of the stand erection signal, the constant operating speed hold inhibiting means 12a provides a constant operating speed hold inhibit signal Sp to a constant operating speed holding means 10.

FIG. 5 is a flow chart of assistance in explaining the operation of a preferred embodiment of the present invention. The operation in accordance with the present invention will be described with reference to the block diagram of the essential portion of the motorcycle described with reference to FIG. 2.

In this embodiment, the position of the main stand is detected by a limit switch, not shown. A detection signal Sb provided by the limit switch is given to an ACU 20.

When a constant operating speed hold command A is given to the ACU 20, the detection signal Sb provided by the limit switch is received by the ACU 20 in step S30a.

In step S31a, the detection signal Sb is discriminated to see if the main stand is in an erect position. If the main stand is in an erect position, the autocruising operation is inhibited in step S32 by the aforesaid procedure. If the main stand is not in an erect position, step S33 is executed. Operations to be executed in steps S32 and S36 are the same as those executed in steps S32 and S36 of FIG. 3 and hence the description thereof will be omitted.

This embodiment inhibits the constant operating speed holding function when the main stand is in an erect position and it is decided that the motorcycle is virtually stopped to prevent the accidental operation of the constant operating speed holding means in a state other than a moving state.

As is apparent from the foregoing description, according to the present invention, the autocruising function is inhibited regardless of the operating speed calculated on the basis of the engine speed when the rotating speed of the free wheel of the motorcycle is very low and the motorcycle cannot be regarded as being in a moving state or the main stand is set in an erect position and the driving wheel is lifted up from the ground.

Accordingly, the accidental operation of the autocruising function can be prevented.

What is claimed is:

1. A constant operating speed holding system for a motorcycle, comprising:

operating speed calculating means for calculating the operating speed based on an engine speed;

constant operating holding means operatively supplied with the operating speed based on said engine speed for generating a signal for controlling said engine for holding a predetermined operating speed constant in response to a constant operating speed hold command;

wheel speed detecting means for detecting the rotating speed of a wheel of the motorcycle; and constant operating speed hold inhibiting means responsive to the rotating speed of the free wheel of the motorcycle for inhibiting the operation of the constant operating speed holding means when the rotating speed of the free wheel decreases below a predetermined value.

2. The constant operating speed holding system according to claim 1, wherein said operating speed calculating means includes an engine control unit for detecting the speed of the engine and for generating said signal representing the engine speed.

3. A constant operating speed holding system according to claim 1, and further including switching means for selecting a first predetermined speed and a second predetermined speed, one of said first and second predetermined speeds together with the operating speed based on said engine speed being supplied to said constant operating speed holding means for holding a predetermined operating speed constant.

4. The constant operating speed holding system according to claim 1, and further including running speed calculating means including a transmission speed detecting means for detecting the operating speed of the transmission and for generating a signal representative thereof, said signal representing the operating speed of said transmission and a signal representing the operating speed of said engine being supplied to said running speed calculating means for generating a signal representing the running speed supplied to said constant operating speed holding means for holding a predetermined operating speed constant.

5. The constant operating speed holding system according to claim 1, wherein said wheel speed detecting means includes a reed switch for detecting magnetic poles of a magnetic rotor for generating a pulse signal representative of the rotational speed of the free wheel of said motorcycle.

6. A constant operating speed holding system for a motorcycle, comprising:

operating speed calculating means for calculating the operating speed on the basis of engine speed;

constant operating speed holding means for holding the operating speed constant in response to an operating speed hold command;

stand erection detecting means for detecting the main stand of the motorcycle in an erect position; and constant operating speed hold inhibiting means for inhibiting the operation of the constant operating speed holding means upon the detection of the main stand in an erect position by the stand erection detecting means.

7. The constant operating speed holding system according to claim 6, wherein said operating speed calculating means includes an engine control unit for detecting the speed of the engine and for generating a signal representing the engine speed.

8. The constant operating speed holding system according to claim 6, and further including switching means for selecting a first predetermined speed and a second predetermined speed, one of said first and second predetermined speeds together with the operating speed based on said engine speed being supplied to said constant operating speed holding means for holding a predetermined operating speed constant.

9. The constant operating speed holding system according to claim 6, and further including running speed calculating means including a transmission speed detecting means for detecting the operating speed of the transmission and for generating a signal representative thereof, said signal representing the operating speed of said transmission and a signal representing the operating speed of said engine being supplied to said running speed calculating means for generating a signal representing the running speed supplied to said constant operating speed holding means for holding a predetermined operating speed constant.

* * * * *